US009549389B2

(12) United States Patent
Nylander et al.

(10) Patent No.: US 9,549,389 B2
(45) Date of Patent: Jan. 17, 2017

(54) METHODS AND ARRANGEMENTS FOR PAGING A COMMUNICATION DEVICE

(75) Inventors: Tomas Nylander, Värmdö (SE); Mats Buchmayer, Stockholm (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1552 days.

(21) Appl. No.: 12/991,502

(22) PCT Filed: Apr. 20, 2009

(86) PCT No.: PCT/SE2009/050397
§ 371 (c)(1),
(2), (4) Date: Nov. 8, 2010

(87) PCT Pub. No.: WO2009/136844
PCT Pub. Date: Nov. 12, 2009

(65) Prior Publication Data
US 2011/0058542 A1    Mar. 10, 2011

Related U.S. Application Data

(60) Provisional application No. 61/051,127, filed on May 7, 2008.

(51) Int. Cl.
*H04W 4/00* (2009.01)
*H04W 68/00* (2009.01)
(Continued)

(52) U.S. Cl.
CPC ........... *H04W 68/00* (2013.01); *H04W 84/045* (2013.01); *H04W 88/12* (2013.01)

(58) Field of Classification Search
CPC ..... H04W 68/00; H04W 88/12; H04W 84/045
(Continued)

(56) References Cited

U.S. PATENT DOCUMENTS 8,165,590 B2 *  4/2012  Gunnarsson et al. ........ 455/446
2009/0070694 A1 *  3/2009  Ore et al. ....................... 715/764
(Continued)

FOREIGN PATENT DOCUMENTS

WO    WO 2007/040452 A    4/2007

OTHER PUBLICATIONS

Nokia Siemens Networks et al: "HeNB and CSG addressing" 3GPP Draft; R3-081322 t 3rd Generation Partnership Project (3GPP), Mobile Competence Centre ; 650, Route Des Lucioles ; F-06921 Sophia-Antipolis Cedex ; France , vol. RAN WG3,No. Kansas City,USA; May 5, 2008,Apr. 30, 2008 (Apr. 30, 2008), XP050164495 p. 2,paragraph 2.2.3-p. 3, paragraph 2.2.3.
(Continued)

*Primary Examiner* — Thai Hoang
(74) *Attorney, Agent, or Firm* — Withrow + Terranova, PLLC

(57) ABSTRACT

A method for forwarding a page message to a communication device includes receiving a page message and a list of Closed Subscriber Group (CSG) Identities in conjunction therewith. Each of the CSG Identities is indicative of which radio base stations among said plurality of radio base stations the communication device is allowed to access. The method also includes selecting, based on the list of CSG Identities received in conjunction with the received page message, a subset of radio base stations among said plurality of radio base stations and forwarding the page message to each radio base station in the selected subset of radio base stations, whereby the communication device is paged only via radio base stations that the communication device is allowed to access.

12 Claims, 4 Drawing Sheets

(51) Int. Cl.
   *H04W 84/04*     (2009.01)
   *H04W 88/12*     (2009.01)
(58) Field of Classification Search
   USPC ............... 370/328, 338; 455/410–411, 444,
   455/446–448, 456.1–458
   See application file for complete search history.

(56) References Cited

U.S. PATENT DOCUMENTS

2009/0094351 A1\* 4/2009 Gupta et al. ................. 709/220
2009/0094680 A1\* 4/2009 Gupta et al. ...................... 726/3
2009/0325634 A1\* 12/2009 Bienas et al. .............. 455/552.1
2010/0240397 A1\* 9/2010 Buchmayer et al. ...... 455/456.1

OTHER PUBLICATIONS

Huawei: "Iu-based 3G HNB Architecture" 3GPP Draft; R3-081166_IU-Based 3G HNB Architecture, 3rd Generation Partnership Project (3GPP), Mobile Competence Centre ; 650, Route Des Lucioles ; F-06921 Sophia-Antipolis Cedex ; France, vol. RAN WG3, No. Kansas City, USA; May 5, 2008, Apr. 29, 2008 (Apr. 29, 2008), XP050164359 p. 1, paragraph 2.1-p. 3, paragraph 2.2 p. 9, paragraph 9 figure 1.

\* cited by examiner

US 9,549,389 B2

METHODS AND ARRANGEMENTS FOR PAGING A COMMUNICATION DEVICE

This application claims the benefit of U.S. Provisional Application No. 61/051,127, filed May 7, 2008, the disclosure of which is fully incorporated herein by reference.

TECHNICAL FIELD

The present invention relates to a method and arrangement in a telecommunication system, in particular to paging optimization in an evolved UTRAN (E-UTRAN) applying so called Home eNodeBs.

More particularly, the present invention relates to methods and arrangements in a gateway node and a core network node for paging a communication device. Specifically, the present invention relates to a method and an arrangement in a gateway node for forwarding a page message to a communication device and to a method and arrangement in a core network node for sending a page message to a communication device via a gateway node.

BACKGROUND

Specification is ongoing in 3GPP for E-UTRAN (Evolved Universal Terrestrial Radio Access Network) that is the next generation of Radio Access Network. Another name used for E-UTRAN is the Long Term Evolution (LTE) Radio Access Network (RAN). A base station in this concept is called eNB (E-UTRAN eNodeB). The specifications also include the possibility to have an E-UTRAN base station to provide home or small area coverage for a limited number of users. This base station is called HeNB (Home eNodeB) in this document. The HeNB would provide normal coverage for the end users and would be connected to the mobile core network using some kind of IP based transmission. The coverage provided is called femto cell in this document. One of the main drivers of this new concept of providing Local Access is to provide cheaper call or transaction rates/charges when connected via the HeNB compared to when connected via the eNB. The HeNB would in most cases use the end users already existing broadband connection (e.g. xDSL, Cable) to achieve connectivity to the operators mobile core network and possibly to other eNB/HeNB. FIG. 1 illustrates an E-UTRAN with femto cells and HeNBs.

With the use of HeNBs the number of base stations the Core Network (CN) nodes need to interface with will be significantly higher than for a 'normal macro deployment', i.e. there may be 100 000's or even millions HeNBs in a network which will cause scalability problems in the CN nodes. This means that the MME (Mobility Management Entity) would need to have connections to all these HeNBs.

Therefore, it appears to be reasonable to include a 'HeNB concentrator' node in the network architecture, in the 3GPP specifications the concentrator node is referred to as a HeNB gateway (HeNB GW) or gateway node. It is also most likely that all the HeNBs will belong to a few TAs (Tracking Area) and that a one single TA is allocated for each HeNB. For example, FIG. 1 shows one scenario where "TA10" is allocated for all HeNBs. The location of a UE, user equipment, is known in CN on TA level or on a TA list level. This means that a new concept of multiple TAs for the registration and paging area has been introduced. Expressed differently, the TA list is a new concept that has been introduced to minimize the need for TA updates. The CN furthermore knows which eNBs serve a particular TA. So in case a UE terminated session needs to be established, the MME in a 'normal' macro deployment sends a page message to the macro eNB(s) serving the relevant TA(s).

However, in the HeNB case with a concentrator node, for example just one or a few TA(s) are exposed towards the CN (as a result of the concentration performed). So in this case, the TA does not uniquely pinpoint which HeNB the UE is camping on. For example, if 10 different TAs/TAIs are allocated and reused between all the HeNBs, then approximately ¹⁄₁₀ of the HeNBs belong to the same TA. If there exists 1 million of HeNBs in the network, then ~100 000 of these would share the same TA/TAI. So a page message received from a MME would in the HeNB case mean that the 'HeNB concentrator' would need forward the page to all HeNBs that has been allocated the particular TA. This means that the 'concentrator' needs to spend a lot of processing power on sending the page message towards lots of HeNBs and a lot of load is generated on the backhaul transport network between the HeNB concentrator and the HeNBs. The backhaul is most likely owned by the subscribers where it is inappropriate to have the links flooded with useless paging messages on HeNBs where the UE being paged is not even allowed to access.

In the SAE/LTE 3GPP standards a concept known as CSG (Closed Subscriber Group) has been introduced. With CSG, particular HeNBs can be associated to certain UEs meaning that only these associated UEs are allowed to access the HeNB(s). The allowed CSGs are stored in the UE in a so called CSG Whitelist (or "Allowed CSG List"). Each HeNB broadcasts the CSG Identity allocated to it in System Information (SI) such that a UE that 'hears' (i.e. is able to read the SI) a CSG that is stored in its CSG Whitelist knows that it is allowed to access this HeNB. The association is also known by the CN (MME) which may perform an access control based on UE identity and the CSG identity of the current HeNB cell when an UE is accessing the network. This access control is mostly usable in the case when the stored CSG Whitelist in the UE is wrong. The CSG Identity can be, e.g., equal to the combination of TA Identifier and Cell Id but could also be considered to be a new identity.

Also in previous system architectures, sometime referred to as 3G systems, the concept of small area coverage base stations and the concept of CSG have been introduced. In a 3G system, such as WCDMA system, the Home eNodeB is referred to as a Home NodeB (without 'e') or HNB for short. Similarly, the HeNB concentrator or gateway node is referred to as a HNB GW, which is an abbreviation for Home NodeB gateway.

Therefore, there is a need for an improvement of the method for sending a page message to a mobile terminal in a telecommunication system.

In WO2007040452, there is disclosed a method for paging control to a femto radio base station of a radio access network. The paging is controlled by maintaining a paging control database of allowed user equipment units for which paging is permitted in a cell of a femto radio base station. When a page message is received, the paging control database is used to redefine an effective paging area for a target user equipment unit. Thus, with this method, the paging control database is accessed in order to determine which cells to page. Then, the page message is forwarded only to femto radio base stations which are included in the effective paging area.

SUMMARY

It is the object of the embodiments of the present invention to achieve methods and arrangements to overcome problems related to paging addressing, e.g., as described above.

In particular, it is an object of the present invention to provide an improved method for sending a page message to a mobile terminal.

According to an aspect of the invention, the object is achieved by a method in a gateway node for forwarding a page message to a communication device. The gateway node serves a plurality of radio base stations, such as Home NodeBs or Home eNodeBs. A radio communication system comprises the gateway node, the communication device and said plurality of radio base stations. In a step, the gateway node receives the page message and a list of Closed Subscriber Group Identities, CSG Identities or CSG Identifiers, in conjunction therewith. Each of the CSG Identities is indicative of which radio base station (or radio base stations) among said plurality of radio base stations the communication device is allowed to access. It shall, hence, be noted that a plurality of radio base stations may have the same CSG identity. In another step, the gateway node selects, based on the list of CSG Identities received in conjunction with the received page message, a subset of radio base stations among said plurality of radio base stations. In a further step, the gateway node forwards the page message to each radio base station in the selected subset of radio base stations. Consequently, the communication device is paged only via radio base stations being allowably accessible by the communication device.

According to another aspect of the invention, the object is achieved by an arrangement in a gateway node for forwarding a page message to a communication device. The gateway node serves a plurality of radio base stations, such as Home NodeBs or Home eNodeBs. A radio communication system comprises the gateway node, the communication device and said plurality of radio base stations. The arrangement may comprise a receiving unit configured to receive the page message and a list of Closed Subscriber Group Identities, CSG Identities, in conjunction therewith. Each of the CSG Identities is indicative of which radio base station among said plurality of radio base stations the communication device is allowed to access. The arrangement may further comprise a processing unit configured to select, based on the list of CSG Identities receivable in conjunction with the received page message, a subset of radio base stations among said plurality of radio base stations. Furthermore, the arrangement may comprise a sending unit configured to forward the page message to each radio base station in the selected subset of radio base stations. In this manner, the communication device is paged only via radio base stations which are allowably accessible by the communication device.

According to a further aspect of the invention, the object is achieved by a method in a core network node for sending a page message to a communication device via a gateway node. The gateway node serves a plurality of radio base stations. A radio communication system comprises the core network node, the communication device, the gateway node and said plurality of radio base stations. In a step, the core network node sends the page message and a list of Closed Subscriber Group Identities, CSG Identities, in conjunction therewith, to the gateway node. Each of the CSG Identities is indicative of which radio base stations among said plurality of radio base stations the communication device is allowed to access. In this manner, the gateway node is able to select, based on the list of CSG Identities received in conjunction with the received page message, a subset of radio base stations among said plurality of radio base stations.

According to yet another aspect of the invention, the object is achieved by an arrangement in a core network node for sending a page message to a communication device via a gateway node. The gateway node serves a plurality of radio base stations. A radio communication system comprises the core network node, the communication device, the gateway node and said plurality of radio base stations. The arrangement may comprise a sending unit configured to send the page message and a list of Closed Subscriber Group Identities, CSG Identities, in conjunction therewith, to the gateway node. Each of the CSG Identities is indicative of which radio base stations among said plurality of radio base stations the communication device is allowed to access. Thus, the gateway node is able to select, based on the list of CSG Identities received in conjunction with the received page message, a subset of radio base stations among said plurality of radio base stations.

Thanks to the fact that the gateway node receives a list of CSG Identities, or CSG Identifiers, in conjunction with the page message, the gateway node may determine which radio base stations among said plurality of radio base stations the mobile terminal to be paged is allowed to access. It is to be noted that the gateway node has at this stage all information that is required to determine which radio base stations to forward the page message to, i.e. the gateway node need not perform any action to retrieve this information from, for example, an MME or the like. By only forwarding the page message to those radio base stations which the mobile terminal may access, the number of radio base stations, to which the page message is to be forwarded, is reduced. Duration of the process for sending a page message to the mobile terminal is reduced due to selection of radio base stations and due to a small number of processing steps required for such selection. As a result, the above mentioned object is achieved.

An advantage of the present solution is, hence, that the signaling load on the radio communication system is reduced. As a result, a more efficient procedure with regard to signaling load is obtained.

A further advantage of the present solution is, thus, that there is no need for accessing further nodes for retrieving information about CSG Identities for a certain user equipment. For example, such a further node may comprise a database for finding CSG Identities for a certain user equipment.

This is achieved by using the concept of CSG also for paging procedures. The core network (CN), i.e. a node in the core network (e.g. the MME, MSC or SGSN), includes the allowed CSG information for a UE when sending a page message for that specific UE towards an eNB (i.e. towards E-UTRAN). In this context the core network node, e.g. MME, sends the page to the 'HeNB concentrator', which then can use the received allowed CSG information for minimizing the paging area and forwarding the page message to the correct and relevant HeNB(s) only.

It is thus an advantage of the present invention that such paging messages need not to be sent to a huge number of HeNBs.

Other objects, advantages and novel features of the invention will become apparent from the following detailed description of the invention when considered in conjunction with the accompanying drawings.

BRIEF DESCRIPTION OF THE DRAWINGS

The various aspects of the invention will be readily understood from the following detailed description and the accompanying drawings, in which.

DETAILED DESCRIPTION

Figure 1:
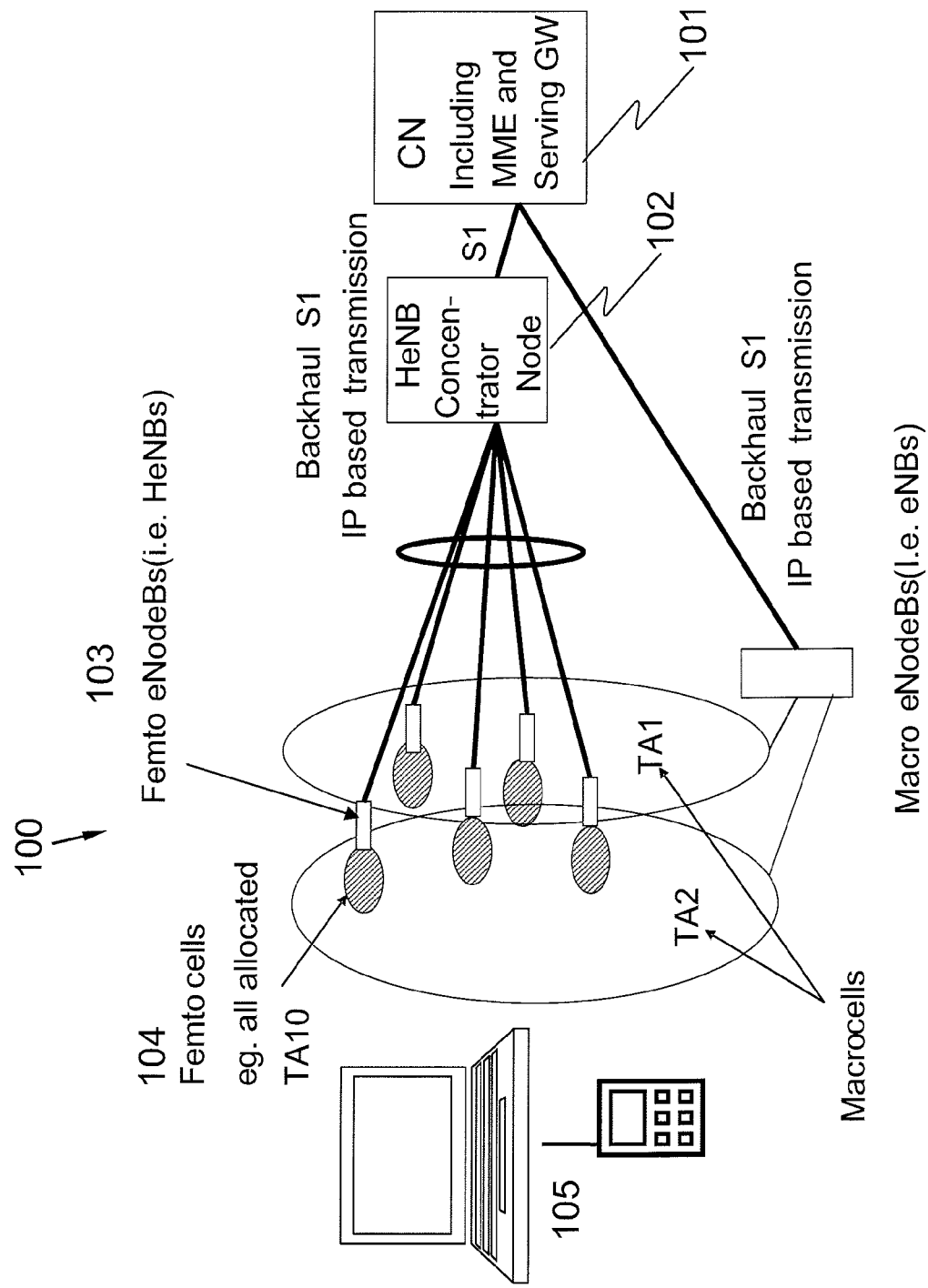
FIG. 1 illustrates an evolved UTRAN with femto cells and HeNBs.

Throughout the following description similar reference numerals have been used to denote similar elements, parts, items or features, when applicable.

The expression "communications device" is to be understood as including, but not limited to, a mobile phone, a cellular phone, a PDA (Personal Digital Assistant) or any other type of portable computer such as laptop computer capable of communicating with a cellular radio communication system.

The 'HeNB concentrator' needs to know the CSG Identifiers for each HeNB in order to handle paging messages, or page messages, that are received from the core network node, e.g. the MME. This can be done, e.g. by building a lookup table from said CSG Identifiers that can be used when such paging messages are received.

There are several conceivable variants to construct or signal the CSG Identifiers between nodes. The description below illustrates examples of embodiments how the 'HeNB concentrator' can obtain information about CSG Identifiers and the HeNBs serving these CSGs. Such embodiments have in common that they are based on similar ways how the CSG Identifier will be used and sent.

According to one embodiment the one or more CSG Identifier(s) are included in the signaling to set up the S1 connection between HeNB and the gateway, or "HeNB concentrator", (in this context the 'HeNB concentrator' may appear as an MME to the HeNB). The gateway node may look at the S1 SETUP REQUEST message received from the HeNB to obtain information about base stations associated with a CSG Identity (e.g. the CSG Identities served by the HeNB).

According to another embodiment the HeNB includes, when a UE establishes a session from a HeNB, the CSG Identifiers in the initial signaling towards the MME. Since this signaling is passing through the 'HeNB concentrator', it can look at the message content to obtain the CSG Identifier and associate it with the HeNB.

According to yet another embodiment the CSG identifiers are allocated by an external O&M node to the HeNBs during the automatic installation procedure. The HeNB concentrator can retrieve the information about which HeNBs are serving specific CSGs from this external O&M node.

The MME then includes the list of allowed CSGs in a paging message (e.g. S1AP PAGING message as defined in 3GPP TS 36.413), which the 'HeNB concentrator' then can use, e.g., to look up which HeNBs the paging message (S1AP PAGING message) should be forwarded to. Such a lookup can be based on, e.g., any of the above listed 3 ways to retrieve the information about which HeNBs are serving a specific CSG.

In a further embodiment the "HeNB concentrator" may also keep a state about the paging message and if there is no response to the first page performed only on the HeNB(s) identified by the list of allowed CSGs, then the "HeNB concentrator" could perform another more global page.

The MME will thus have a list of TAIs that a UE is currently registered to and can provide paging requests to the eNBs and HeNB Gateways (GW), referred to as gateway node above, that are serving those TAIs. In an additional embodiment, in order to provide means for paging filtering at the HeNB GW, the MME can provide the HeNB GW with a list of allowed CSGs for a UE, sometimes referred to as a CSG Whitelist, to restrict the sending of the paging request to those CSGs only for which the UE has access rights.

With reference to FIG. 1, there is illustrated a schematic block diagram of an exemplifying radio communication system 100, such as an LTE system. The radio communication system 100 comprises a plurality of core network nodes 101, such as an MME and a serving gateway. Furthermore, the radio communication system 100 comprises a gateway node 102, or sometimes referred to as a HeNB Concentrator or HeNB Concentrator node, and a plurality of base stations 103, such as femto eNodeBs, HeNBs and Macro eNodeBs, or more commonly referred to as eNBs. The core network node 101 is configured to communicate with the gateway node 102 via an S1 interface. Similarly, the core network node 101 is configured to communicate with the eNBs via a backhaul S1 IP based transmission interface.

Moreover, each HeNB is associated with a respective femto cell 104. For example, all femto cells 104 may be allocated to one tracking area (or registration area) denoted TA10. In other examples, all femto cells are allocated to two or more tracking areas. The eNBs are associated with macro cells as indicated by TA1 and TA2.

Due to the large number of femto eNBs (HeNBs) 103, the load on the backhaul S1 IP based transmission in the radio communication system 100 may be overwhelming in certain situations. The solution presented herein reduces this load, whereby the overall performance in the network is improved.

Figure 2:
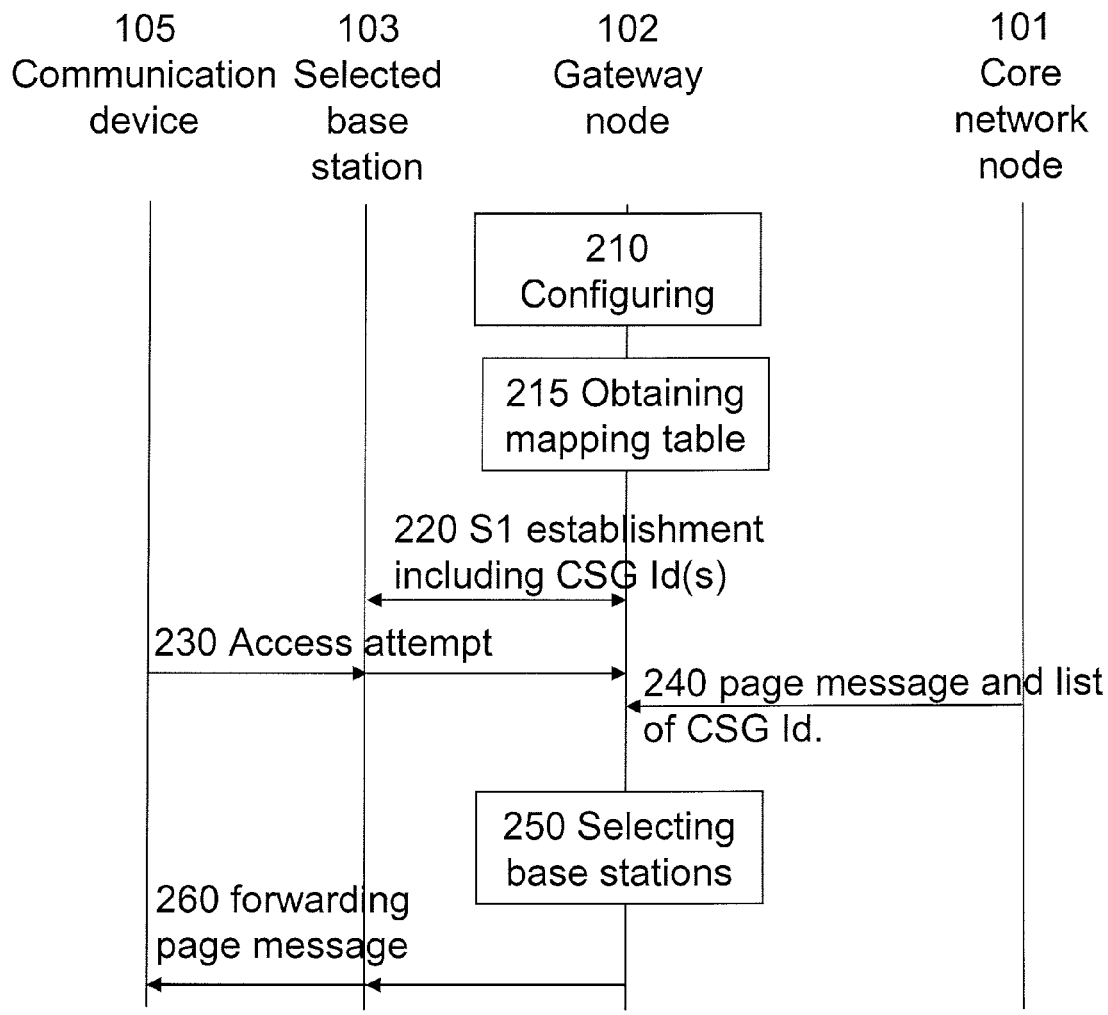
FIG. 2 shows a schematic combined signaling and flow chart of the method for forwarding a page message to a communication device performed in the cellular radio communication system according to FIG. 1.

In FIG. 2, there is shown a schematic, combined signaling and flow chart of an embodiment of a method in the radio communication system 100 of FIG. 1 for paging a communication device.

In a step 210, the gateway node 102 is configured to make use of the CSG Identities received in conjunction with the page message. Hence, the gateway node 102 may after such configuration step utilize the list of CSG Identities, if the list of CSG Identities is received in conjunction with the page message, for basing the selection of the subset of radio base stations thereon.

In an optional step 220, said one or more CSG Identifier(s) are included in the signaling to set up the S1 connection between HeNB and the gateway. The gateway node may look at the S1 SETUP REQUEST message received from the HeNB to obtain information about base stations associated with a CSG Identity (e.g. the CSG Identities served by the HeNB).

In an optional step 225 (not shown in the Figure), the CSG identifiers are allocated by an external O&M node to the HeNBs during the automatic installation procedure. The HeNB concentrator can retrieve the information about which HeNBs are serving specific CSGs from this external O&M node.

It may be preferred that at least one of the steps 220, 225 and 230 is performed such as to provide the gateway node 102 with a list of CSG Identities and their associated base stations, such as HeNBs. In general terms, the steps may be identified as a step 215 of obtaining a mapping table for providing an association between a CSG Identity and at least one radio base station, such as a HeNB. Optionally, the step of obtaining comprises building a mapping table by, for example, parsing messages passing through the gateway node 102 for finding information about which radio base station, or radio base stations, serves, or serve, which CSG Identity, and/or retrieving a complete or portions of a mapping table from another network node, such as an O&M node.

In an optional step 230, the communication device 105 makes an access attempt, via a HeNB and the gateway node 102, to the core network node 101. In this manner, the gateway node 102 may obtain information about CSG Identities and the HeNBs serving these CSGs, since this signaling is passing through the gateway node 102, also referred to as 'HeNB concentrator'. The gateway node 102 can look at (or parse) the message content to obtain the CSG Identifier and associate it with the HeNB, whereby a mapping table is built up. The mapping table comprises information about which HeNBs are associated with which CSGs.

In a step 240, the core network node 101 sends a page message and a list of Closed Subscriber Group Identities, CSG Identities, in conjunction therewith to the gateway node 102. Each of the CSG Identities is indicative of which radio base station 103 among said plurality of radio base stations 103 the communication device 105 is allowed to access.

In a step 250, the gateway node 102 selects, based on the list of CSG Identities received in conjunction with the received page message and, optionally, the mapping table built up according to step 215, a subset of radio base stations 103 among said plurality of radio base stations 103.

In a step 260, the gateway node 102 forwards the page message to each radio base station 103 in the selected subset of radio base stations 103, whereby the communication device 105 is paged only via radio base stations 103 being allowably accessible by the communication device 105.

Figure 3:
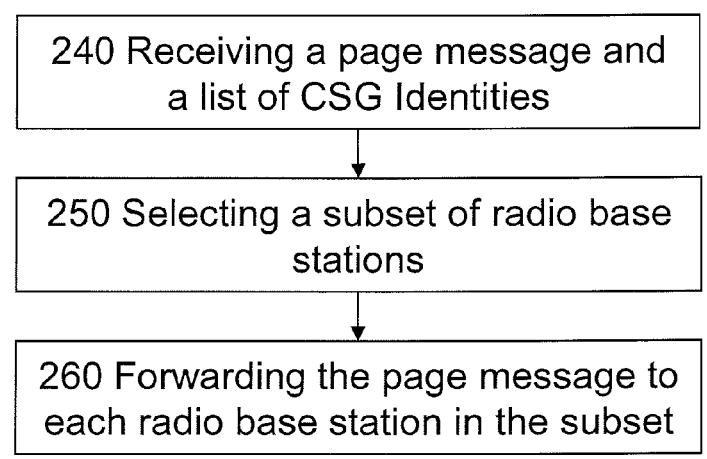
FIG. 3 shows a schematic flow chart of an embodiment of the method in the gateway node for forwarding a page message to the communication device.

Now referring to FIG. 3, there is shown an embodiment of the method in the gateway node 102 for forwarding a page message to a communication device 105. The gateway node 102 serves a plurality of radio base stations, such as Home eNodeBs, 103. A radio communication system 100 comprises the gateway node 102, the communication device 105 and said plurality of radio base stations 103. Some of the following steps may be performed.

In a step 240, the gateway node 102 receives the page message and a list of Closed Subscriber Group Identities, CSG Identities, in conjunction therewith. Each of the CSG Identities is indicative of which radio base station 103 among said plurality of radio base stations 103 the communication device 105 is allowed to access.

In a step 250, the gateway node 102 selects, based on the list of CSG Identities received in conjunction with the received page message and, optionally, the mapping table built up according to step 215, a subset of radio base stations 103 among said plurality of radio base stations 103. Preferably, the number of radio base stations in the selected subset of radio base stations is less than the number of base stations indicated by the list of CSG Identities, i.e. the subset of radio base stations does not necessarily comprise every radio base station that the mobile terminal is allowed to access.

In a step 260, the gateway node 102 forwards the page message to each radio base station 103 in the selected subset of radio base stations 103, whereby the communication device 105 is paged only via radio base stations 103 being allowably accessible by the communication device 105.

In some embodiments of the method in the gateway node 102, the method further comprises, before the step of receiving 240 the page message, a step of configuring 210 the gateway node 102 to utilize the list of CSG Identities, if the list of CSG Identities is received in conjunction with the page message, for basing the selection of the subset of radio base stations thereon.

In some embodiments of the method in the gateway node 102, the page message comprises the list of CSG Identities. In this manner, the page message itself comprises all the information necessary for improving the duration of the paging process. For example, it may be that the duration of the paging process is reduced or that signaling necessary for paging is decreased.

In some embodiments of the method in the gateway node 102, the page message further comprises at least one area identity for identifying areas in which the communication device is to be paged in. The selection of radio base stations, such as HeNBs, is further based on said at least one area identity (or area identifiers), wherein the area identity comprises a Tracking Area Identity, or Tracking Area Identifier, TAI, wherein the radio communication system 100 comprises an LTE system, a Location Area Identity, or Location Area Identifier, LAI, and/or a Routing Area Identity, or Routing Area Identifier, RAI, wherein the radio communication system 100 comprises a UTRAN system. In this manner, the selected subset of radio base stations comprises fewer radio base stations than indicated by the list of CSG Identities, i.e. the selected subset of base stations comprises those base stations which the communication device is allowed to access and which may at high probability successfully page the communication device as based on area identity information. It may be preferred that the number of base stations first is restricted with regard to area identity information and then, secondly, is restricted with regard to the list of CSG Identities.

In some embodiments of the method in the gateway node 102, the gateway node 102 comprises a HeNB Gateway or a HNB Gateway as required by the type of the radio communication system 100, which may be a LTE or UTRAN or other radio communication system.

In some embodiments of the method in the gateway node 102, the method further comprises a step 215 of obtaining information about CSG Identities and the radio base stations serving the CSGs, identified by the CSG Identities. Optionally, the step 215 comprises at least one of the steps 220, 225 and 230.

In some embodiments of the method in the gateway node 102, the method further comprises a step of receiving a request for connection from a radio base station 103, i.e. during S1 SETUP procedure in case the radio communication system is an LTE system, wherein the request comprises information about any CSG Identities associated with the radio base station. If the eNB initiating the S1 SETUP procedure supports one or more CSG cells, the S1 SETUP REQUEST shall contain the CSG IDs of the supported CSGs. This procedure is specified in 3GPP TS 36.413. In this manner, the gateway node or the MME, i.e. the node that receives S1 SETUP REQUEST, receives information about base stations associated with a CSG Identity.

In some embodiments of the method in the gateway node 102, each of the radio base stations 103 is configured to support use of CSG Identities. Such as CSG supporting node may be referred to as a CSG node. For example, the radio base station 103 may be a macro, micro, pico or femto base station. The base station 103 is normally deployed in home, campus, enterprise and the like environments.

In some embodiments of the method in the gateway node 102, the method further comprises if no response to the page message is received from the communication device 105, a step of forwarding the page message to a greater number of radio base stations 103 than the number of radio base stations 103 in the selected subset of radio base stations 103 (via which the communication device was previously paged). For example, if a paging strategy as follows is used, then it may be useful to increase the number of base stations as described above. When the communication device is first paged via a first number of base stations, for example selected because the communication device was last know to be in a cell associated with one of the base stations and no response from the communication device is received, then in order to receive a response a new paging attempt need to be effected. Such new paging attempt should preferably comprise a greater number of radio base stations than the first number of radio base stations.

Figure 4:
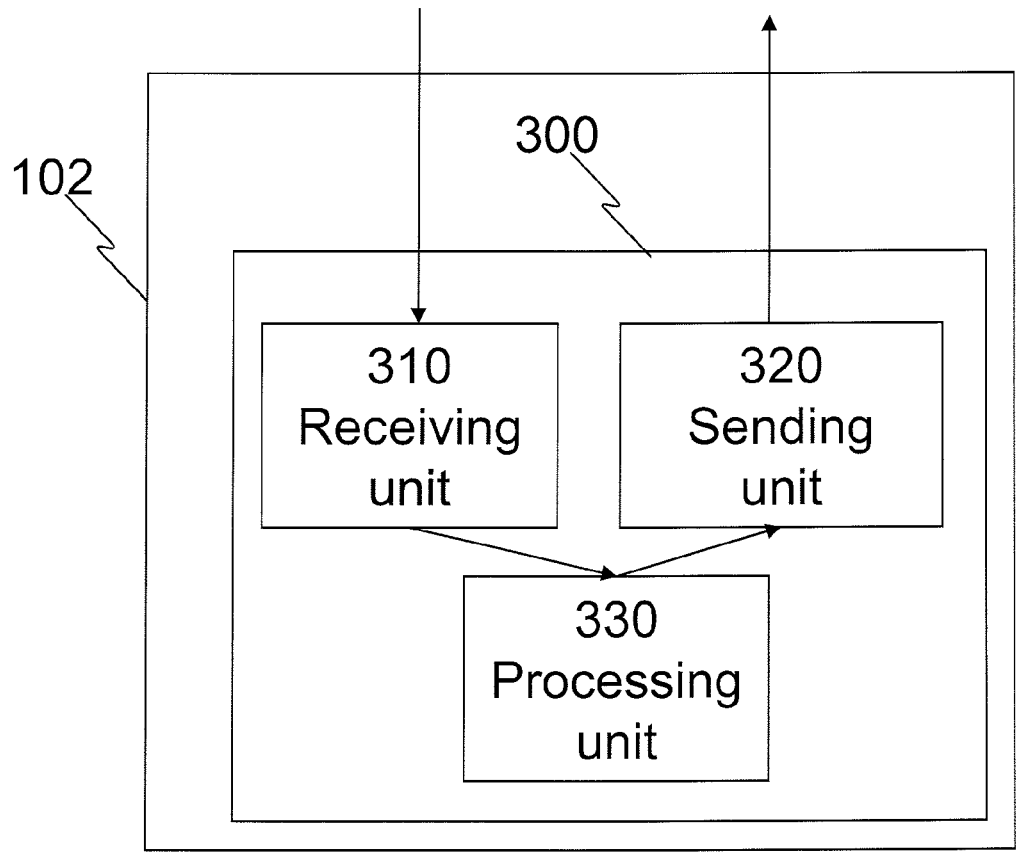
FIG. 4 shows a schematic block diagram of an embodiment of the arrangement in the gateway node for forwarding a page message to the communication device.

In FIG. 4, there is shown a schematic block diagram of an embodiment of the arrangement 300 in a gateway node 102 for forwarding a page message to a communication device 105. The gateway node 102 may comprise the arrangement 300. The gateway node 102 serves a plurality of radio base stations, such as Home eNodeBs, 103. A radio communication system 100 comprises the gateway node 102, the communication device 105 and said plurality of radio base stations 103. The arrangement 300 may comprise a receiving unit 310 configured to receive the page message and a list of Closed Subscriber Group Identities, CSG Identities, in conjunction therewith. Each of the CSG Identities is indicative of which radio base station 103 among said plurality of radio base stations 103 the communication device 105 is allowed to access. The arrangement 300 may further comprise a processing unit 330 configured to select, based on the list of CSG Identities receivable in conjunction with the received page message, a subset of radio base stations 103 among said plurality of radio base stations 103. Furthermore, the arrangement may comprise a sending unit 320 configured to forward the page message to each radio base station 103 in the selected subset of radio base stations 103. In this manner, the communication device 105 is paged only via radio base stations 103 which are allowably accessible by the communication device 105.

In some embodiments of the arrangement 300 in the gateway node 102, the page message comprises the list of CSG Identities. In this manner, the page message itself comprises all the information necessary for reducing the duration of the paging process.

In some embodiments of the arrangement 300 in the gateway node 102, the page message further comprises at least one area identity for identifying areas in which the communication device is to be paged in. The selection of radio base stations, such as HeNBs, is further based on said at least one area identity, wherein the area identity comprises a Tracking Area Identity, TAI, wherein the radio communication system 100 comprises an LTE system, a Location Area Identity, LAI, and/or a Routing Area Identity, RAI, wherein the radio communication system 100 comprises a UTRAN system. This feature has the same or similar effect and/or function as the corresponding feature of the method in the gateway node 102.

In some embodiments of the arrangement 300 in the gateway node 102, the gateway node 102 comprises a HeNB Gateway or a HNB Gateway as required by the type of the radio communication system 100, which may be a LTE or UTRAN or other radio communication system.

In some embodiments of the arrangement 300 in the gateway node 102, each of the radio base stations 103 is configured to support use of CSG Identities. Such a CSG supporting node may be referred to as a CSG node. For example, the radio base station 103 may be a macro, micro, pico or femto base station. The base station 103 is normally deployed in home, campus, enterprise and the like environments.

Figure 5:
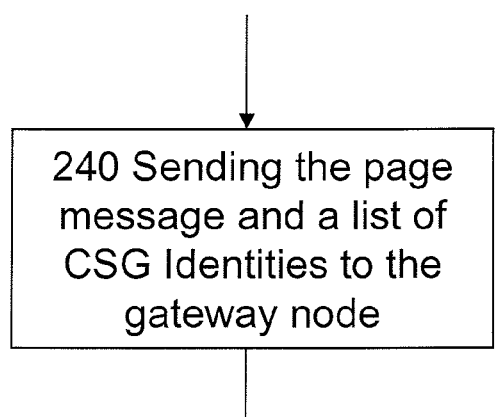
FIG. 5 shows a schematic flow chart of an embodiment of the method in the core network node for sending a page message to the communication device via a gateway node.

With reference to FIG. 5, there is shown a schematic flow chart of an embodiment of the method in the core network node 101 for sending a page message to a communication device 105 via a gateway node 102. The gateway node 102 serves a plurality of radio base stations 103. A radio communication system 100 comprises the core network node 101, the communication device 105, the gateway node 102 and said plurality of radio base stations 103. The following step may be performed.

In a step 240, the core network node 101 sends the page message and a list of Closed Subscriber Group Identities, CSG Identities, in conjunction therewith, to the gateway node 102. Each of the CSG Identities is indicative of which radio base stations 103 among said plurality of radio base stations 103 the communication device 105 is allowed to access. In this manner, the gateway node 102 is able to select, based on the list of CSG Identities received in conjunction with the received page message, a subset of radio base stations 103 among said plurality of radio base stations 103.

In some embodiments of the method in the core network node 101 for sending a page message to a communication device 105 via a gateway node 102, the core network node 101 comprises an MME when the radio communication system 100 comprises an LTE system, or the core network node 101 comprises an MSC and/or an SGSN when the radio communication system 100 comprises a UTRAN system.

In some embodiments of the method in the core network node 101 for sending a page message to a communication device 105 via a gateway node 102, the page message comprises the list of CSG Identities.

In some embodiments of the method in the core network node 101 for sending a page message to a communication device 105 via a gateway node 102, each of the radio base stations 103 is configured to support use of CSG Identities.

Figure 6:
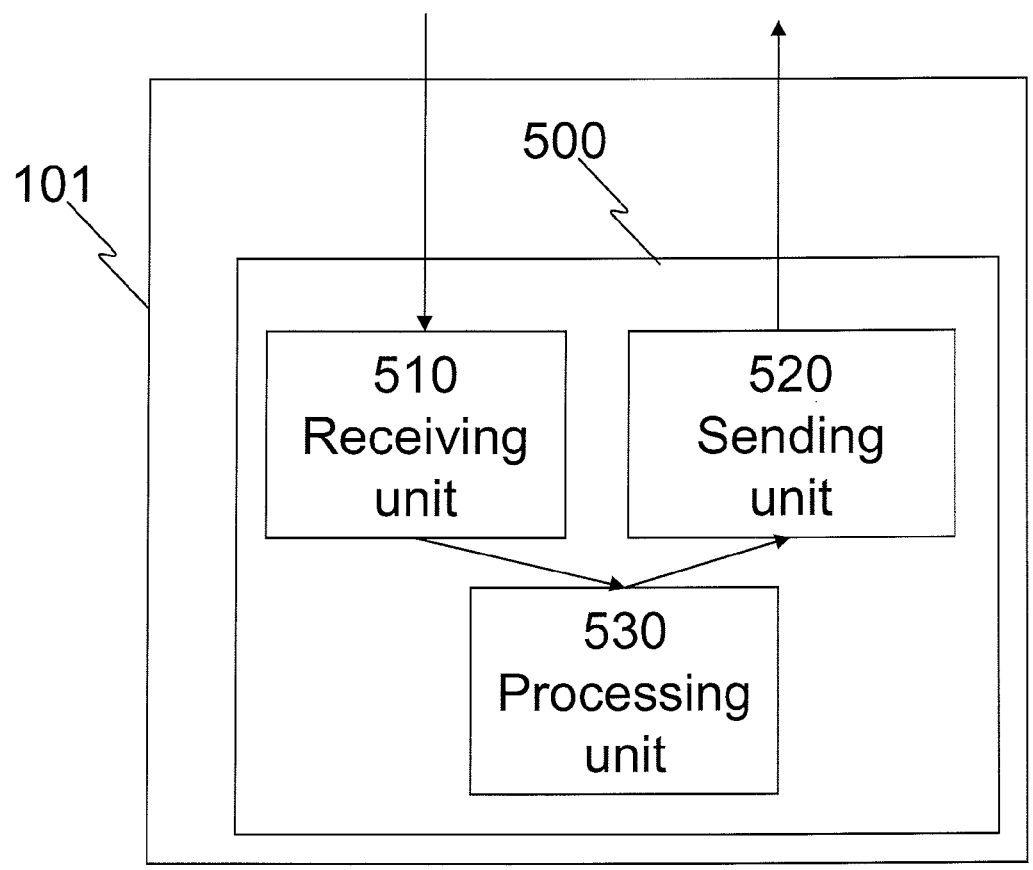
FIG. 6 shows a schematic block diagram of an embodiment of the arrangement in the core network node for sending a page message to the communication device via a gateway node.

In FIG. 6, there is shown a schematic block diagram of an embodiment of the arrangement 500 in the core network node 101 for sending a page message to a communication device 105 via a gateway node 102. The core network node 101 may comprise the arrangement 500. The gateway node 102 serves a plurality of radio base stations 103. A radio communication system 100 comprises the core network node 101, the communication device 105, the gateway node 102 and said plurality of radio base stations 103. The arrangement 500 may comprise a sending unit 520 configured to send the page message and a list of Closed Subscriber Group Identities, CSG Identities, in conjunction therewith, to the gateway node 102. Each of the CSG Identities is indicative of which radio base stations 103 among said plurality of radio base stations 103 the communication device 105 is allowed to access. Thus, the gateway node 102 is able to select, based on the list of CSG Identities received in conjunction with the received page message, a subset of radio base stations 103 among said plurality of radio base stations 103. Optionally, the arrangement 500 further comprises at least one of a receiving unit 510 and a processing unit 530.

In some embodiments of the arrangement 500 in the core network node 101 for sending a page message to a communication device 105 via a gateway node 102, the core network node 101 comprises an MME when the radio communication system 100 comprises an LTE system, or the core network node 101 comprises an MSC and/or an SGSN when the radio communication system 100 comprises a UTRAN system.

In some embodiments of the arrangement 500 in the core network node 101 for sending a page message to a communication device 105 via a gateway node 102, the page message comprises the list of CSG Identities.

In some embodiments of the arrangement 500 in the core network node 101 for sending a page message to a communication device 105 via a gateway node 102, each of the radio base stations 103 is configured to support use of CSG Identities.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a gateway node for forwarding a page message to a communication device, wherein the gateway node serves a plurality of radio base stations, wherein a radio communication system comprises the gateway node, the communication device and said plurality of radio base stations, the method comprising:
   receiving the page message and a list of Closed Subscriber Group (CSG) Identities, in conjunction therewith, wherein each of the CSG identities is indicative of which radio base stations among said plurality of radio base stations the communication device is allowed to access;
   selecting, based on the list of CSG Identities received in conjunction with the received page message, a subset of radio base stations among said plurality of radio base stations; and
   forwarding the page message to each radio base station in the selected subset of radio base stations, whereby the communication device is paged only via radio base stations that the communication device is allowed to access.

2. The method according to claim 1, further configuring the gateway node, before receiving the page message, to select the subset of radio base stations based on the list of CSG Identities that will be received in conjunction with the page message.

3. The method according to claim 1, wherein the page message comprises the list of CSG Identities.

4. The method according to claim 1, wherein the page message comprises at least one area identity indicating areas in which the communication device is to be paged in, and wherein selecting the subset of radio base stations comprises selecting the subset of radio base stations based on said at least one area identity, wherein the area identity comprises a Tracking Area Identity (TAI) and wherein the radio communication system comprises a Long Term Evolution (LTE) system.

5. The method according to claim 1, wherein gateway node comprises a Home eNode B (HeNb) Gateway or a Home Node B (HNB) Gateway.

6. The method according to claim 1, wherein each of the radio base stations is configured to support use of CSG Identities.

7. The method according to claim 1, further comprising:
   obtaining information about CSG Identities and the radio base stations serving the CSGs, identified by the CSG Identities.

8. An apparatus in a gateway node for forwarding a page message to a communication device, wherein the gateway node serves a plurality of radio base stations, wherein a radio communication system comprises the gateway node, the communication device and said plurality of radio base stations, the apparatus comprising:
   a receiving unit configured to receive the page message and a list of Closed Subscriber Group (CSG) identities, in conjunction therewith, wherein each of the CSG Identities is indicative of which radio base station among said plurality of radio base stations the communication device is allowed to access;
   a processing unit configured to select, based on the list of CSG Identities receivable in conjunction with the received page message, a subset of radio base stations among said plurality of radio base stations; and
   a sending unit configured to forward the page message to each radio base station in the selected subset of radio base stations, whereby the communication device is paged only via radio base stations that the communication device is allowed to access.

9. The apparatus according to claim 8, wherein the receiving unit is configured to receive the page message by receiving a page message that comprises the list of CSG Identities.

10. The apparatus according to claim 8, wherein the receiving unit is configured to receive the page message by receiving a page message that comprises at least one area identity indicating areas in which the communication device is to be paged in, and wherein selecting the subset of radio base stations comprises selecting the subset of radio base stations based on said at least one area identity, wherein the area identity comprises a Tracking Area Identity (TAI) and wherein the radio communication system comprises a Long Term Evolution (LTE) system.

11. The apparatus according to claim 8, wherein the apparatus comprises a Home eNode B (HeNb) Gateway or a Home Node B (HNB) Gateway.

12. The apparatus according to claim 8, wherein the receiving unit is further configured to obtain information about CSG Identities and the radio base stations serving the CSGs identified by the CSG Identities.

* * * * *